United States Patent
Wu et al.

(10) Patent No.: US 9,098,253 B2
(45) Date of Patent: Aug. 4, 2015

(54) INFORMATION HANDLING SYSTEM TOOL-LESS DAUGHTER CARD RETAINER AND LATCH

(71) Applicant: Dell Products L.P., Round Rock, TX (US)

(72) Inventors: Hsien-Chih Wu, Chang-Chung (TW); Yao-Chien Lien, Taipei (TW); Chih-Hsiang Lee, Taipei (TW); Chien-Hung Chou, Sijhih (TW)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 13/753,765

(22) Filed: Jan. 30, 2013

(65) Prior Publication Data

US 2014/0211402 A1     Jul. 31, 2014

(51) Int. Cl.
*G06F 1/18*     (2006.01)
(52) U.S. Cl.
CPC . *G06F 1/186* (2013.01); *G06F 1/18* (2013.01); *Y10T 29/4913* (2015.01)
(58) Field of Classification Search
CPC ........... G06F 1/18; G06F 1/186; H05F 13/04; H05F 13/046
USPC ............................................ 361/732, 679.32
See application file for complete search history.

(56) References Cited

U.S. PATENT DOCUMENTS

| | | | |
|---|---|---|---|
| 6,138,839 A * | 10/2000 | Cranston et al. | 211/41.17 |
| 6,442,038 B1 * | 8/2002 | Erickson et al. | 361/759 |
| 6,738,261 B2 * | 5/2004 | Vier et al. | 361/740 |
| 7,126,828 B2 | 10/2006 | Beall et al. | |
| 7,254,041 B2 * | 8/2007 | Chen et al. | 361/801 |
| 7,724,538 B2 | 5/2010 | Tsai et al. | |
| 7,876,576 B2 | 1/2011 | Mills et al. | |
| 7,974,100 B2 | 7/2011 | Chen et al. | |
| 2004/0079711 A1 * | 4/2004 | Hartman et al. | 211/26 |
| 2007/0030631 A1 * | 2/2007 | Liang et al. | 361/600 |
| 2007/0120861 A1 * | 5/2007 | Zhong et al. | 345/520 |
| 2010/0162045 A1 * | 6/2010 | Russ et al. | 714/23 |
| 2013/0135813 A1 * | 5/2013 | Jimenez et al. | 361/679.32 |

* cited by examiner

*Primary Examiner* — Dion R Ferguson
*Assistant Examiner* — Mandeep Buttar
(74) *Attorney, Agent, or Firm* — Terrile, Cannatti, Chambers & Holland, LLP; Robert W. Holland (57) ABSTRACT

Daughter cards couple to an information handling system chassis and are secured in place with insertion of a retainer in a retainer guide that aligns to engage with securing elements of the daughter cards coupled to the chassis. A hinge member couples the retainer to the retainer guide between an inserted position and an idle position to maintain the retainer attached to the chassis but removed out of the way for daughter card manipulation during addition or removal of the daughter card at the chassis.

20 Claims, 12 Drawing Sheets

INFORMATION HANDLING SYSTEM TOOL-LESS DAUGHTER CARD RETAINER AND LATCH

BACKGROUND OF THE INVENTION

1. Field of the Invention

The present invention relates in general to the field of information handling system component assembly, and more particularly to an information handling system tool-less daughter card retainer and latch.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are generally built from a wide variety of components. Selecting components to include within an information handling system helps end users target the capabilities of the information handling system for planned tasks. Typically, an information handling system has a motherboard that couples to a chassis to support communication between information handling system components. A typical motherboard is a printed circuit board (PCB) that has one or more central processing unit (CPU) sockets to accept one or more CPUs for executing instructions. The CPU sockets interface through the motherboard with memory sockets that hold memory for storing information in support of executing instructions, such as DIMM sockets that hold DRAM modules. The motherboard can interface with a variety of other components, such as an embedded controller, a network interface module, a graphics processor and other types of chipset components supported by the motherboard that perform processing functions. Generally, components interface through the motherboard using standardized communications links, such as a PCI or PCIe bus.

In some instances, processing functions are performed by components located off the motherboard, such as components supported by daughtercards. Daughtercards are typically a PCB with function-specific components, such as graphics components or network communication components. Daughtercards generally include an interface that provides communication with the motherboard through the motherboard's communications link, such as a PCI or PCIe bus. For example, PCIe slots are coupled to the motherboard and interfaced with the motherboard PCIe bus so that daughterboards couple with the slots to communicate with other components through the motherboard PCIe bus. By distributing functions to daughterboards, an information handling system provides end users with greater flexibility for the selection of components. For example, a graphics subsystem built on a daughterboard will typically provide more effective graphics processing than the graphics components included with a chipset coupled to a motherboard. As another example, a server adjusts to interface with local area networks and/or storage networks by inserting appropriate PCIe interface cards into PCIe motherboard slots for the desired interfaces.

One difficulty with the use of daughtercards is ensuring that the daughter cards will securely couple to the motherboard with sound electrical interfaces. Secure attachment often involves retainer latches that loosen and tighten to allow insertion and removal of daughtercards. Often such retainer latches are not intuitive or user-friendly so that end users have difficulty interacting with the information handling system to install or remove daughtercards. In some instances, retainer latches interfere with information handling system operations, such as by providing a location through which electromagnetic interference (EMI) can leak.

SUMMARY OF THE INVENTION

Therefore a need has arisen for a system and method which securely couples daughtercards to an information handling system.

In accordance with the present invention, a system and method are provided which substantially reduce the disadvantages and problems associated with previous methods and systems for securing daughtercards to an information handling system. A retainer inserts into a retainer guide at an information handling system chassis so that the retainer secures the daughter cards to the chassis. A latch of the retainer removeably couples the retainer in the inserted position to prevent removal of the daughter cards until the latch is released and the retainer is removed from the retainer guide.

More specifically, an information handling system processes information with processing components disposed in a chassis, such as a processor that executes instructions, memory that stores the instructions and a motherboard that interfaces the processor and memory. Information is communicated through links of the motherboard, such as a PCIe bus managed by a PCIe controller. Expansion card slots interfaced with the motherboard accept insertion daughter cards that communicate with processing components through the motherboard, such as through PCIe expansion slots interfaced with a PCIe bus. In order to secure the daughter cards to the information handling system chassis, securing elements of the daughter cards engage the chassis and are maintained in position with a retainer. The retainer inserts into a retainer guide proximate the daughter card securing elements to prevent movement of the daughter cards. The retainer inserts into a retainer guide that couples to the housing and is held in place when fully inserted by a latch that engages the chassis. A hinge member couples the retainer to the retainer guide when the retainer is removed from the retainer guide and allows the retainer to rotate to an idle position that is readily accessible by an end user without interfering with end user manipulation of daughter cards for insertion or removal at the chassis.

The present invention provides a number of important technical advantages. One example of an important technical advantage is that PCIe daughtercards securely couple to an information handling system with a tool-less mechanical solution that enhances EMI shielding. An injection molded plastic part that is inexpensive to manufacture couples PCIe daughtercards to an information handling system with EMI shielding provided by integrated grounding clips. The tool-less design provides scalable coupling of one or more daughtercards to adjust to information handling systems of different dimensions and complexity. An intuitive and simple mechanism to manipulate securing device remains completely coupled to the information handling system whether coupling or decoupling daughtercards so that loose parts do not get lost during daughtercard adjustments. A concise latching motion secures daughtercards in a manner that is easy for an end user to operate without worrying about loose parts.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A tool-less retainer and latch inserts into a retainer guide to couple a daughter card to an information handling system chassis. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
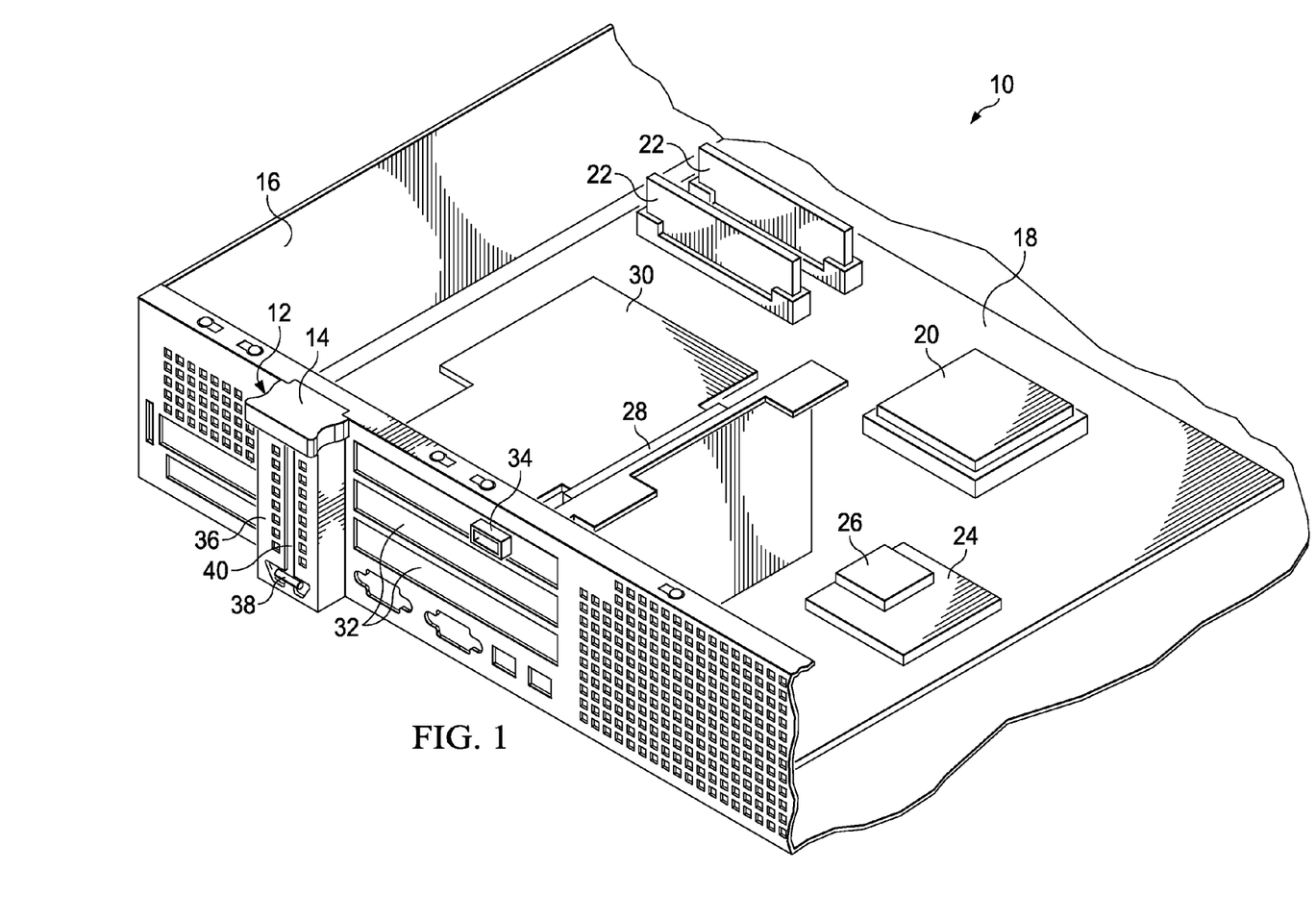
FIG. 1 depicts a top perspective view of an information handling system having tool-less daughter card retainer and latch.

Referring now to FIG. 1, a top perspective view depicts an information handling system 10 having a tool-less daughter card retainer 12 and latch 14. Information handling system 10 processes information with processing components disposed in a chassis 16 that cooperate to process information. For example, a motherboard 18 couples to chassis 16 and supports a processor 20 that executes instructions to process information and a memory 22 interfaced with processor 20 through motherboard 18 that stores the instructions and information. A chipset 24 includes a number of components that execute firmware and other instructions to coordinate processing component interactions. For example, a PCIe controller 26 disposed in chipset 24 coordinates communication between processing components on a PCIe bus disposed in motherboard 18 using the PCIe protocol.

In order to provide increased flexibility in the operations performed by information handling system 10, motherboard 18 interfaces with one or more PICe bus slots 28 that each support an interface with a daughter card 30, such as a PCIe expansion card. For example, plural daughter cards 30 stack vertically proximate to motherboard 18 to interface with vertically stacked PCIe bus slots. Each daughter card 30 is a circuit board that supports processing components to provide expanded functionality of information handling system 10, such as local area network (LAN), storage area network (SAN), fibre channel, additional memory, graphics processing or other functionality. Each daughter card 30 aligns with an expansion slot 32 formed in chassis 16 to expose a communications coupler 34 at the exterior of chassis 16, such as an Ethernet, fiber channel or graphics interface coupler.

Daughter cards 30 are coupled in place to chassis 16 at expansion slots 32 by engaging securing elements to chassis 16, which are held in place by retainer 12 and latch 14. Retainer 12 inserts into a retainer guide 36 coupled to the exterior of chassis 16 to hold the securing elements in place at the interior or chassis 16. A hinge member 38 slides along a hinge member opening 40 formed in retainer guide 36 to keep retainer 12 attached to retainer guide 36 during retraction of retainer 12 from retainer guide 36. Hinge member opening 40 has an extended portion at its lower end so that hinge member 38 can push into the interior of retainer guide 36 to allow complete removal of retainer 12 from retainer guide 36 if desired. Latch 14 couples to the upper portion of retainer guide 36 to hold retainer 12 in place when fully inserted in retainer guide 36. For example, latch 14 is formed from flexible plastic that clips over an edge portion of retainer guide 36 and bends when squeezed to release from the edge portion for removal of retainer 12. Although the example embodiment depicted by FIG. 1 has a rectangular retainer guide 36 formed at the exterior of chassis 16, in alternative embodiments the retainer and retainer guide may have various shapes and may be place on the interior of chassis 16.

Figure 2A:
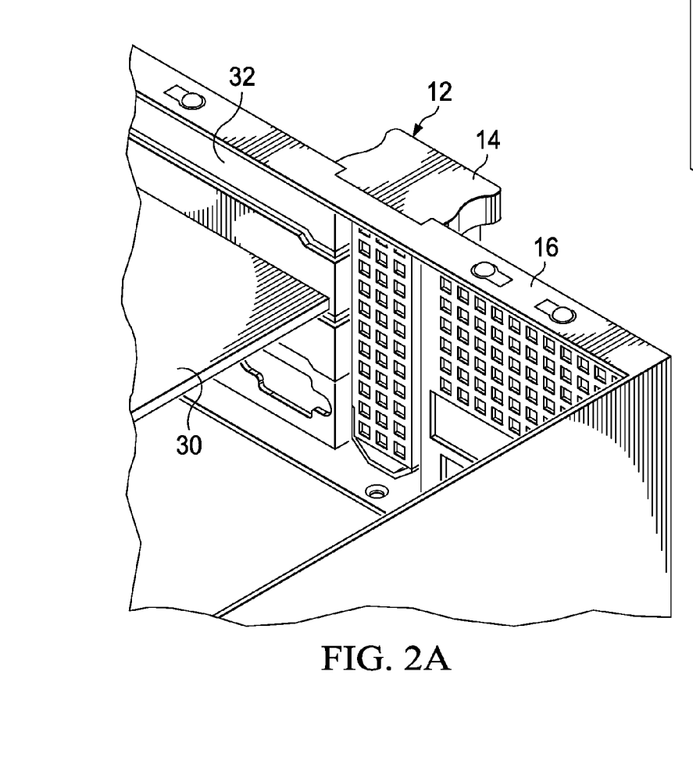
FIG. 2A depicts an interior chassis view of the tool-less daughter card retainer and latch in a secure position.
Figure 2B:
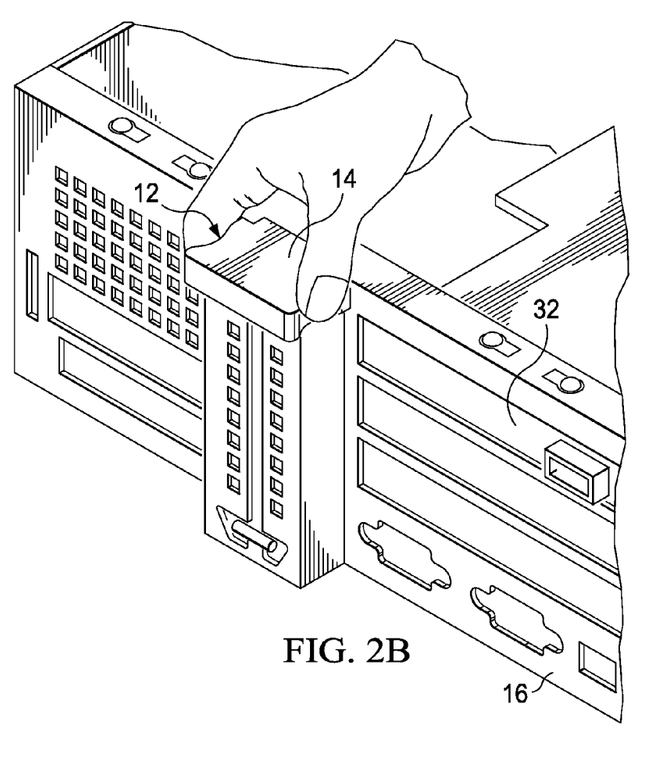
FIG. 2B depicts an exterior chassis view of the tool-less daughter card retainer and latch in a secure position.
Figure 3A:
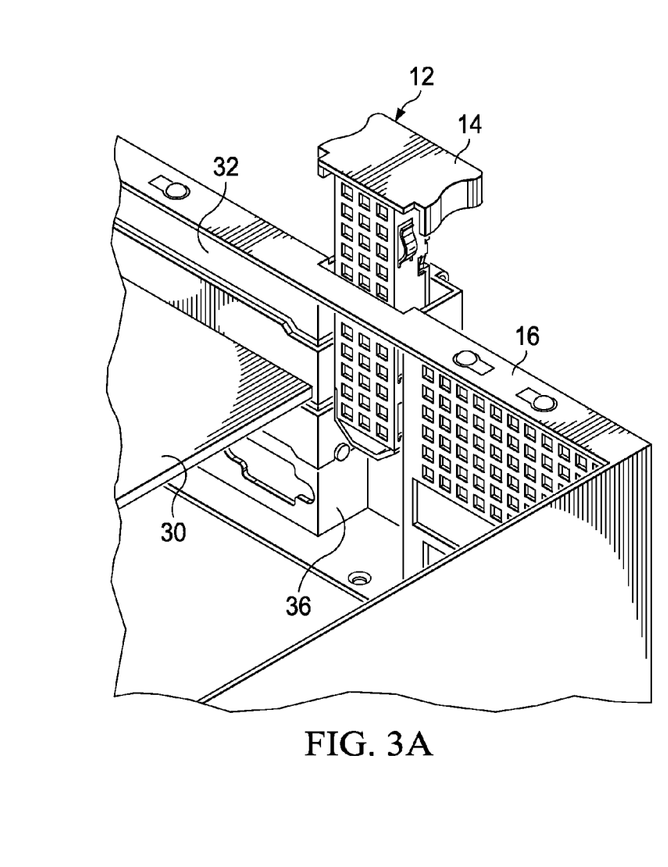
FIG. 3A depicts an interior chassis view of the tool-less daughter card retainer and latch in a 50% open position.
Figure 3B:
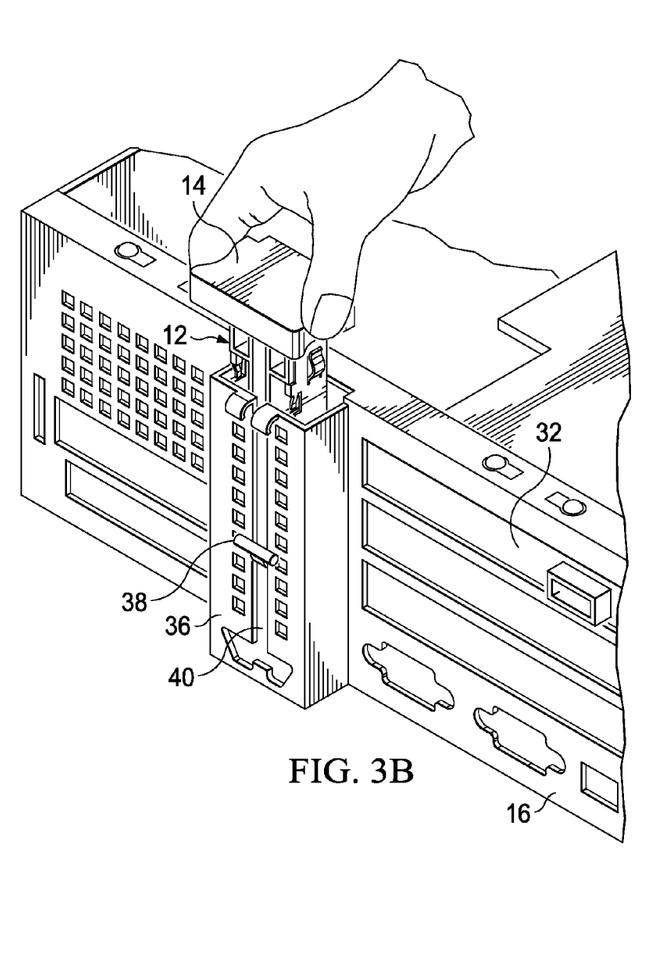
FIG. 3B depicts an exterior chassis view of the tool-less daughter card retainer and latch in a 50% open position.
Figure 4A:
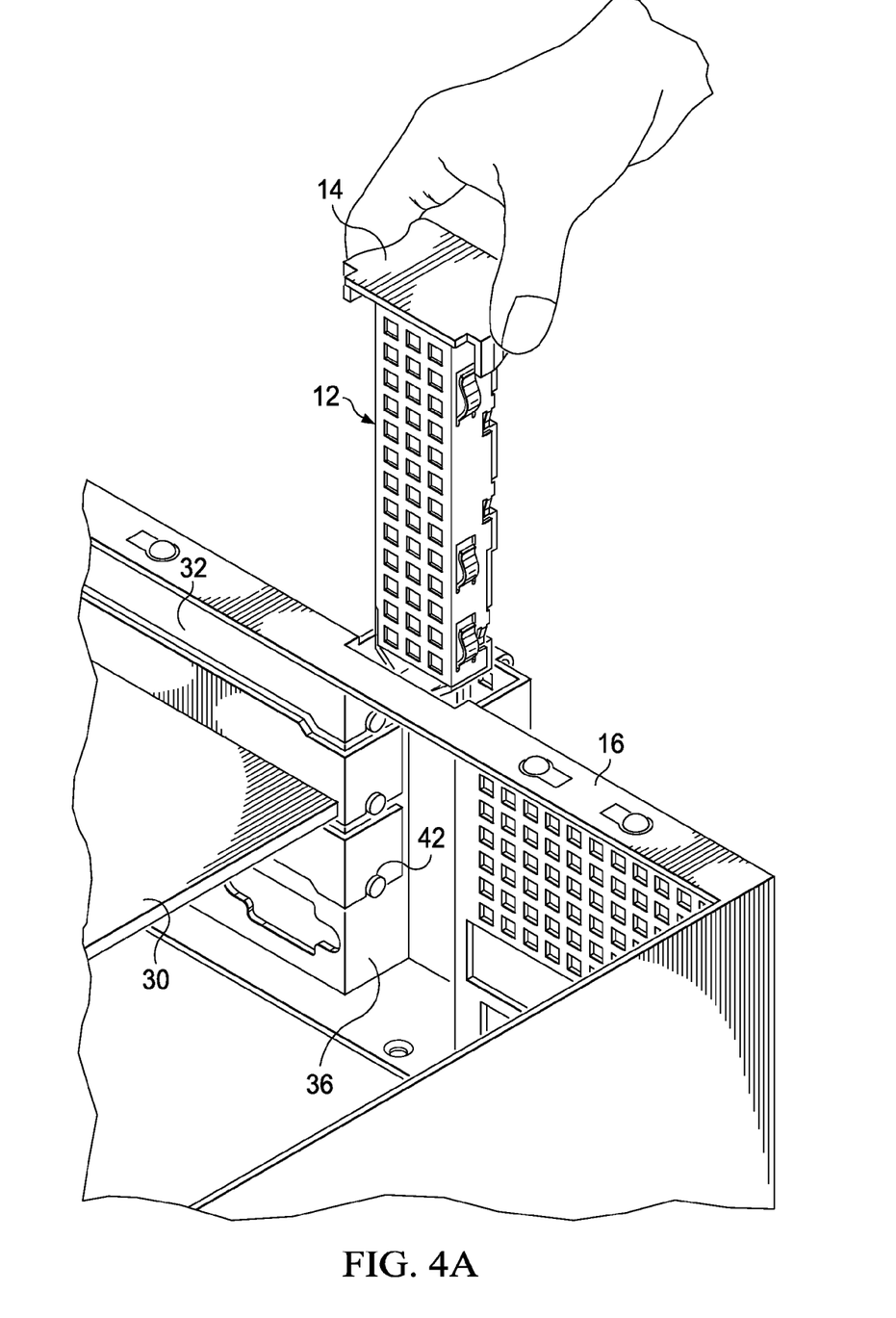
FIG. 4A depicts an interior chassis view of the tool-less daughter card retainer and latch in an open position.
Figure 4B:
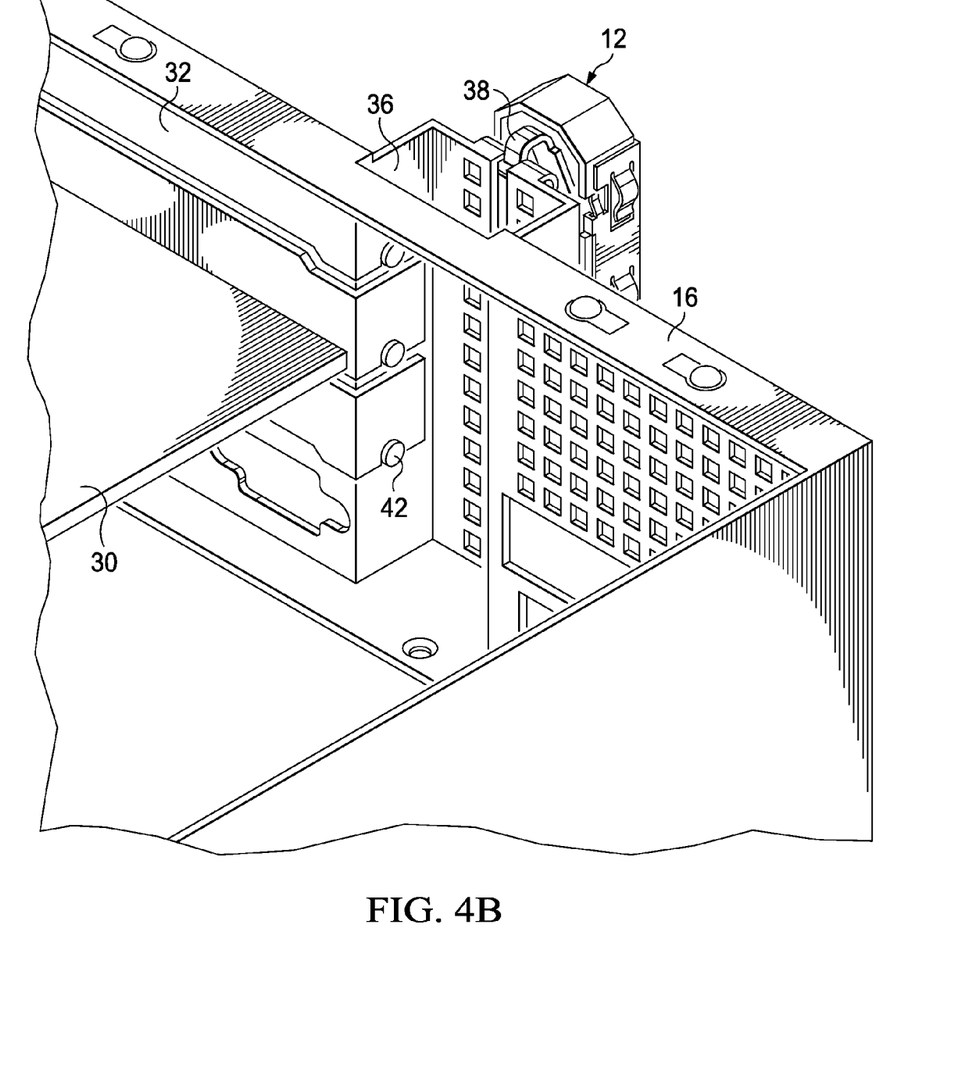
FIG. 4B depicts an interior chassis view of the tool-less daughter card retainer and latch in an open and idle position.
Figure 4C:
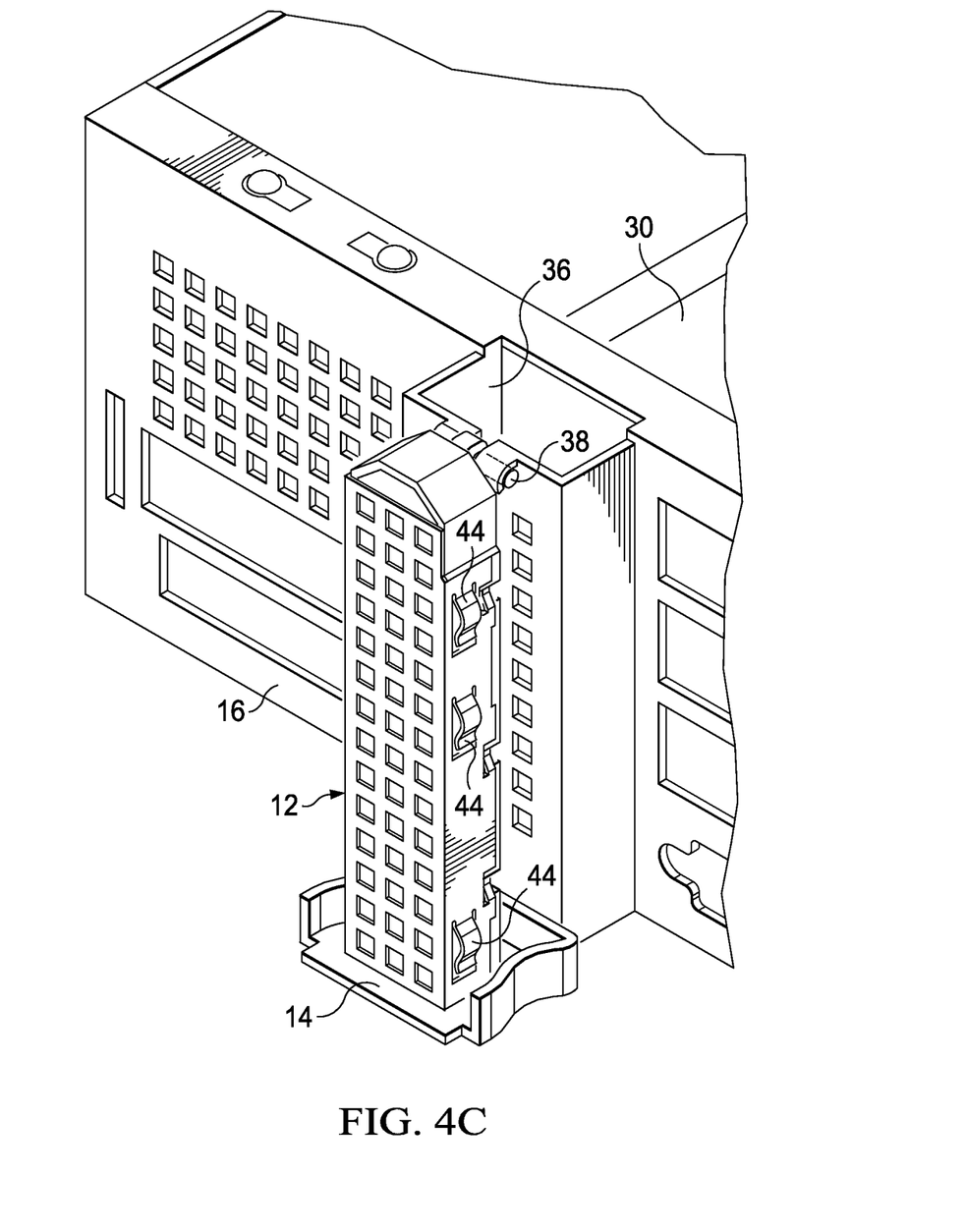
FIG. 4C depicts an exterior chassis view of the tool-less daughter card retainer and latch in an open and idle position.

Referring now to FIGS. 2 through 4, operation of a tool-less daughter card retainer 12 and latch 14 is depicted at an information handling system 10 chassis 16. FIG. 2A depicts a view from the interior of chassis 16 with retainer 12 fully inserted into retainer guide 36 so that latch 14 engages to chassis 16. Daughter card 30 has a securing element captured between retainer 12 and retainer guide 36 to maintain its position at expansion slot 32. FIG. 2B depicts a view from the exterior of chassis 16 in which latch 14 couples to chassis 16 to maintain retainer 12 in retainer guide 36. Squeezing latch 14 releases it from chassis 16 to allow removal of retainer 12 from retainer guide 36 so that daughter cards 30 may be added or removed from chassis 16.

Referring now to FIG. 3A, retainer 12 is depicted from the chassis interior in a 50% open position. Latch 14 was squeezed to release it from chassis 16 upper portion so that retainer 12 could lift out of retainer guide 36. As retainer 12 lifts from the interior of retainer guide 36, securing elements of daughter cards 30 that were trapped by retainer 12 within retainer guide 36 are released to allow removal of the daughter cards from their positions at expansion slot 32. FIG. 3B depicts a view from the exterior of chassis 16 with retainer 12 partially lifted from retainer guide 36 and hinge member 38 moving along hinge member opening 40 to maintain retainer 12 coupled with retainer guide 36.

Referring now to FIG. 4A, retainer 12 is lifted completely out of retainer guide 36 but remains coupled to retainer guide 36 by hinge member 38. Grounding points 42 located within the interior of retainer guide 36 are exposed. Once retainer 12 lifts completely out of retainer guide 36, retainer 12 rotates about hinge member 38 as depicted by FIGS. 4B and 4C. Grounding clips 44 formed in the side of retainer 12 are exposed and illustrate alignment with grounding points 42 during insertion of retainer 12 in retainer guide 36. An exterior view of chassis 16 provided by FIG. 4C illustrates that retainer 12 hangs upside down from hinged member 38 in an idle position at the exterior of chassis 16 to remain out of the way of an end user who is installing or removing a daughter card 30 within chassis 16.

Figure 5:
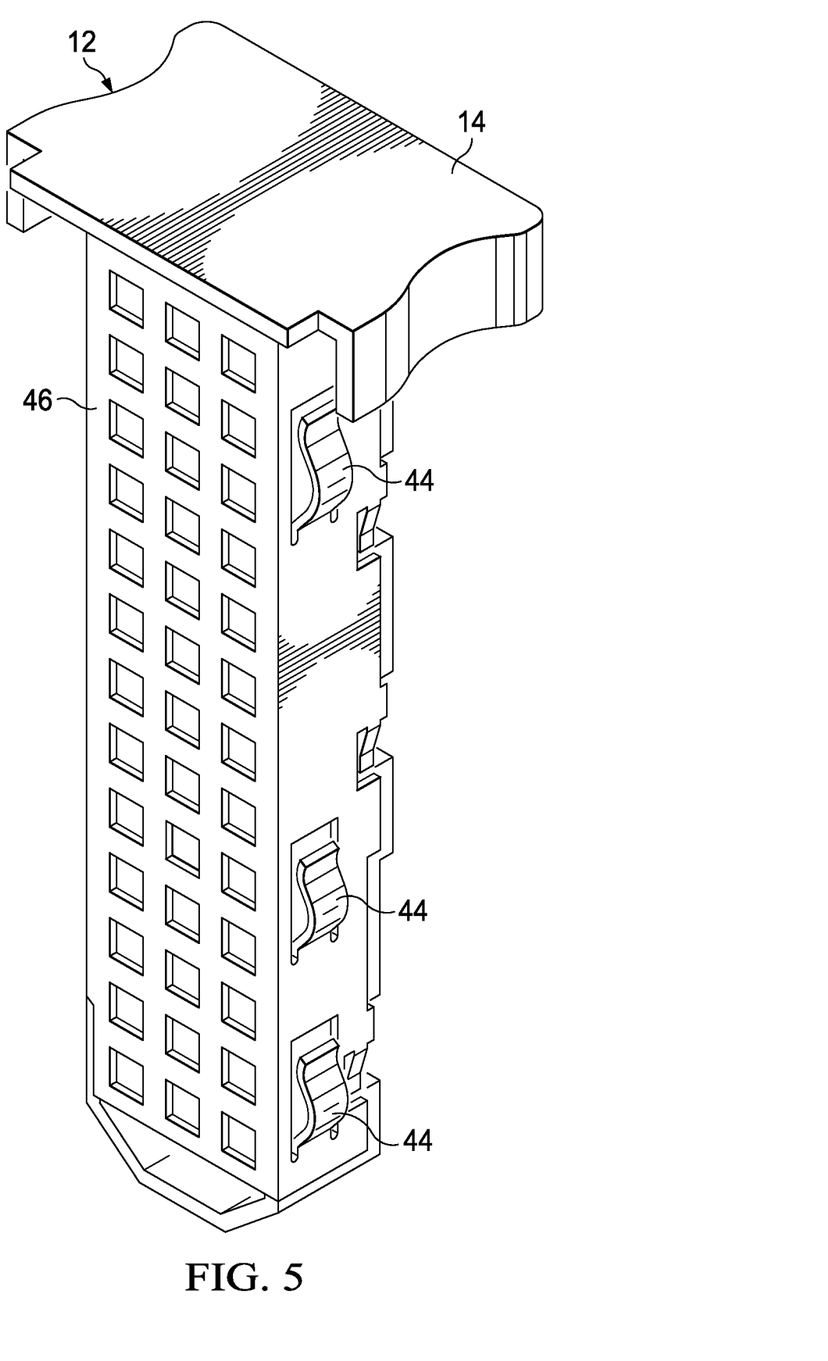
FIG. 5 depicts a top view of an interior chassis portion of the tool-less daughter card retainer and latch removed from the information handling system.

Referring now to FIG. 5, a top view depicts an interior chassis portion of the tool-less daughter card retainer 12 and latch 14 removed from the information handling system. Electromagnetic shielding 46 is exposed at the interior of chassis 16 when retainer 12 is inserted to prevent escape of radiation. Grounding clips 44 ground EMI shielding 46 to chassis 16 to integrate the EMI shielding with that provided by chassis 16. The lower portion of latch 14 is formed with a flexible plastic material to engage with chassis 16 for maintaining retainer 12 in position. In alternative embodiments, alternative types of latches and latch materials may be used, as may alternative types of shapes of retainer 12.

Figure 6:
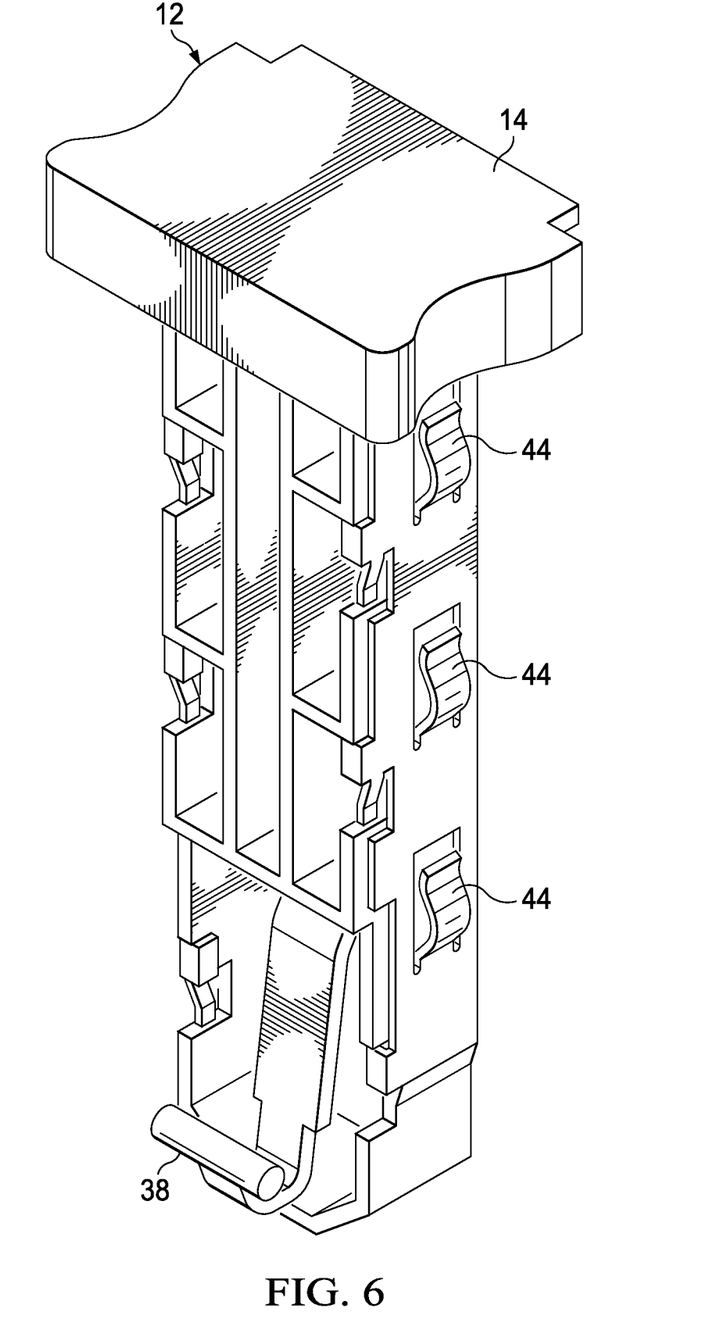
FIG. 6 depicts a top view of an exterior chassis portion of the tool-less daughter card retainer and latch removed from the information handling system.

Referring now to FIG. 6, a top view depicts an exterior chassis portion of the tool-less daughter card retainer 12 and latch 14 removed from the information handling system 10. Hinge member 38 extends outward from retainer 12 to provide room to fit through hinge member opening 40 formed in retainer guide 36. When retainer 12 lifts completely out of retainer guide 36, hinge member 38 couples retainer 12 to retainer guide 36 and allows rotation of retainer 12 outside of retainer guide 36 to an idle position.

Figure 7:
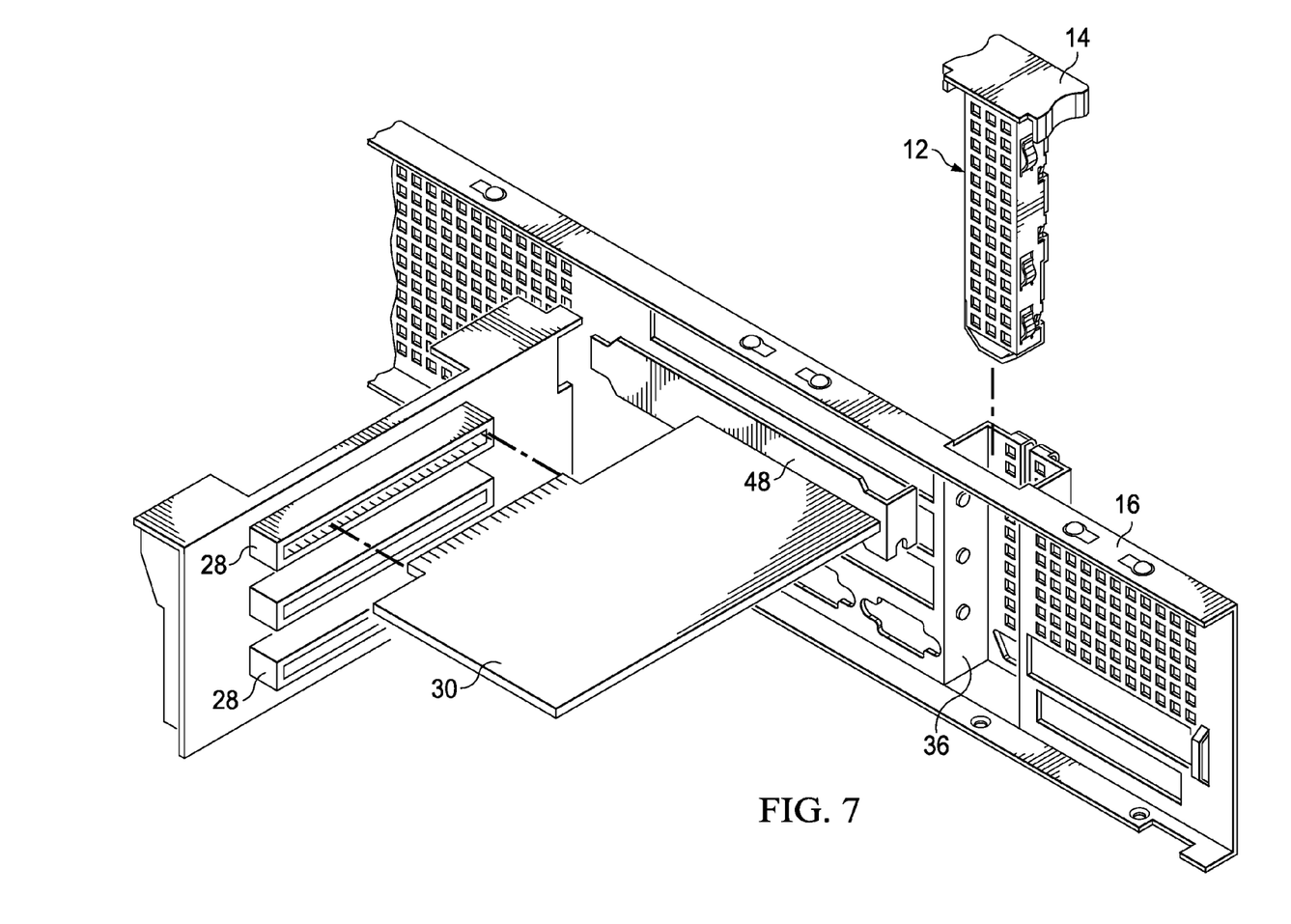
FIG. 7 depicts a top perspective interior view of a daughter card securing element engaged with an information handling system chassis in preparation for securing by the tool-less retainer and latch.

Referring now to FIG. 7, a top perspective interior view depicts a daughter card securing element 48 engaged with an information handling system 10 chassis 16 in preparation for securing by the tool-less retainer 12 and latch 14. Securing element 48 has a sliding portion that engages chassis 16 proximate to proximate to PCIe expander slots 28 and a bent portion that slides into retainer guide 36. As retainer 12 inserts into retainer guide 36 to cover the portion of securing element 48 disposed within retainer guide 36, daughter card 30 is engaged to prevent removal. Latch 14 secures onto chassis 16 to keep retainer 12 in retainer guided 36 so that removal of daughter card 30 is prevented until retainer 12 is removed from retainer guide 36.

Figure 8A:
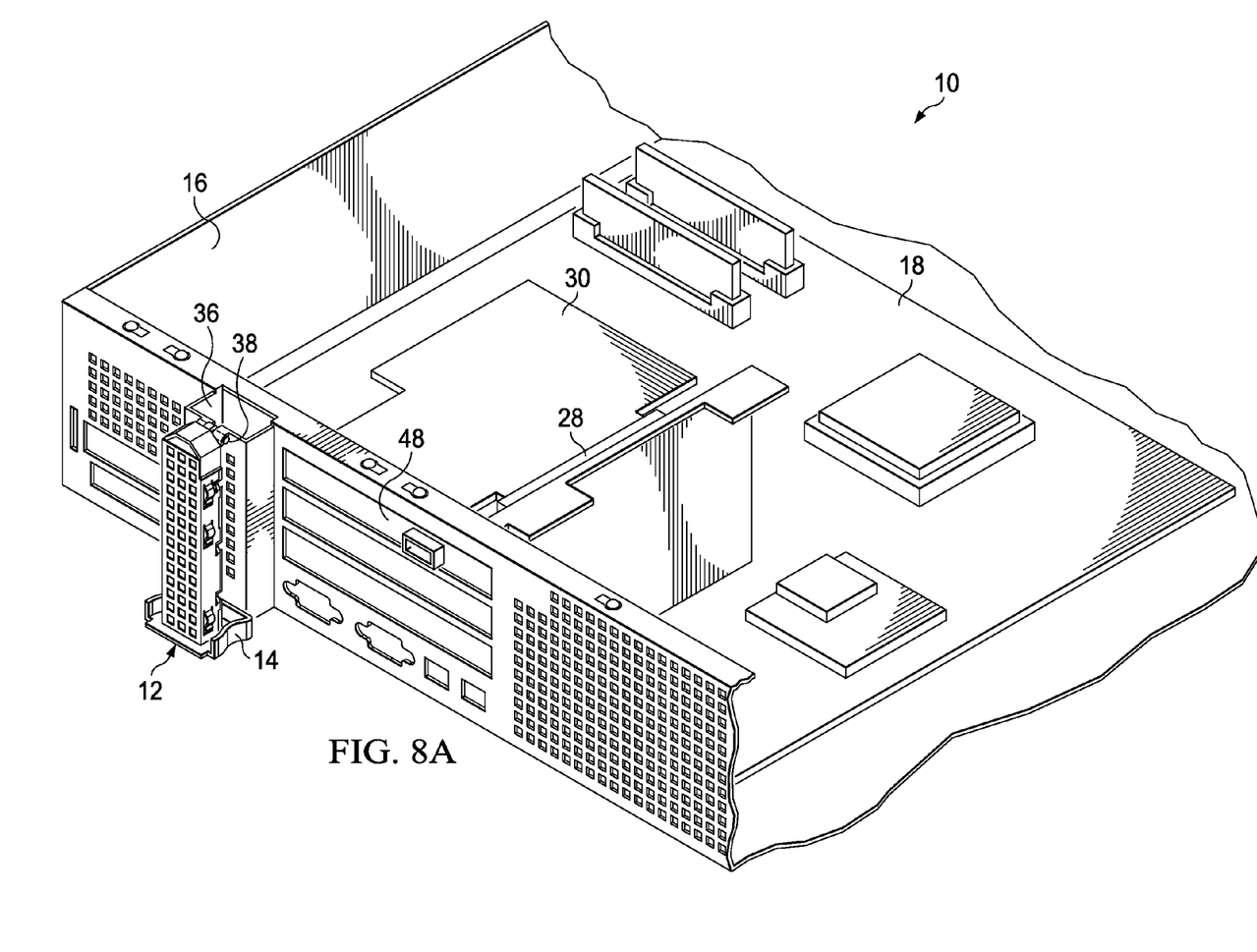
FIG. 8A depicts a top perspective exterior view of a daughter card coupling to a chassis with the tool-less retainer and latch in the open and idle position.
Figure 8B:
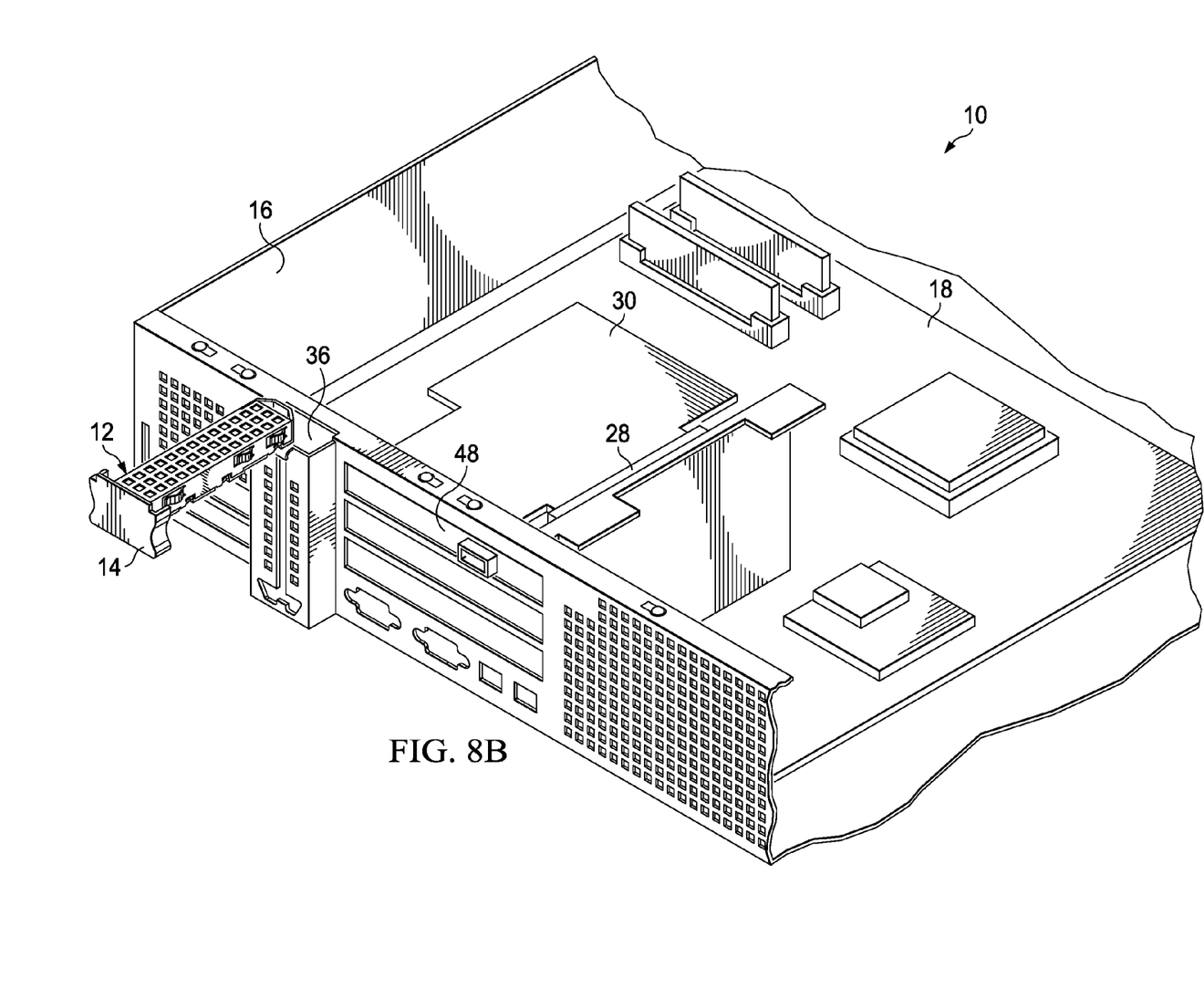
FIG. 8B depicts a top perspective exterior view of a daughter card coupling to a chassis with the tool-less retainer and latch rotating into alignment with the retainer guide.
Figure 8C:
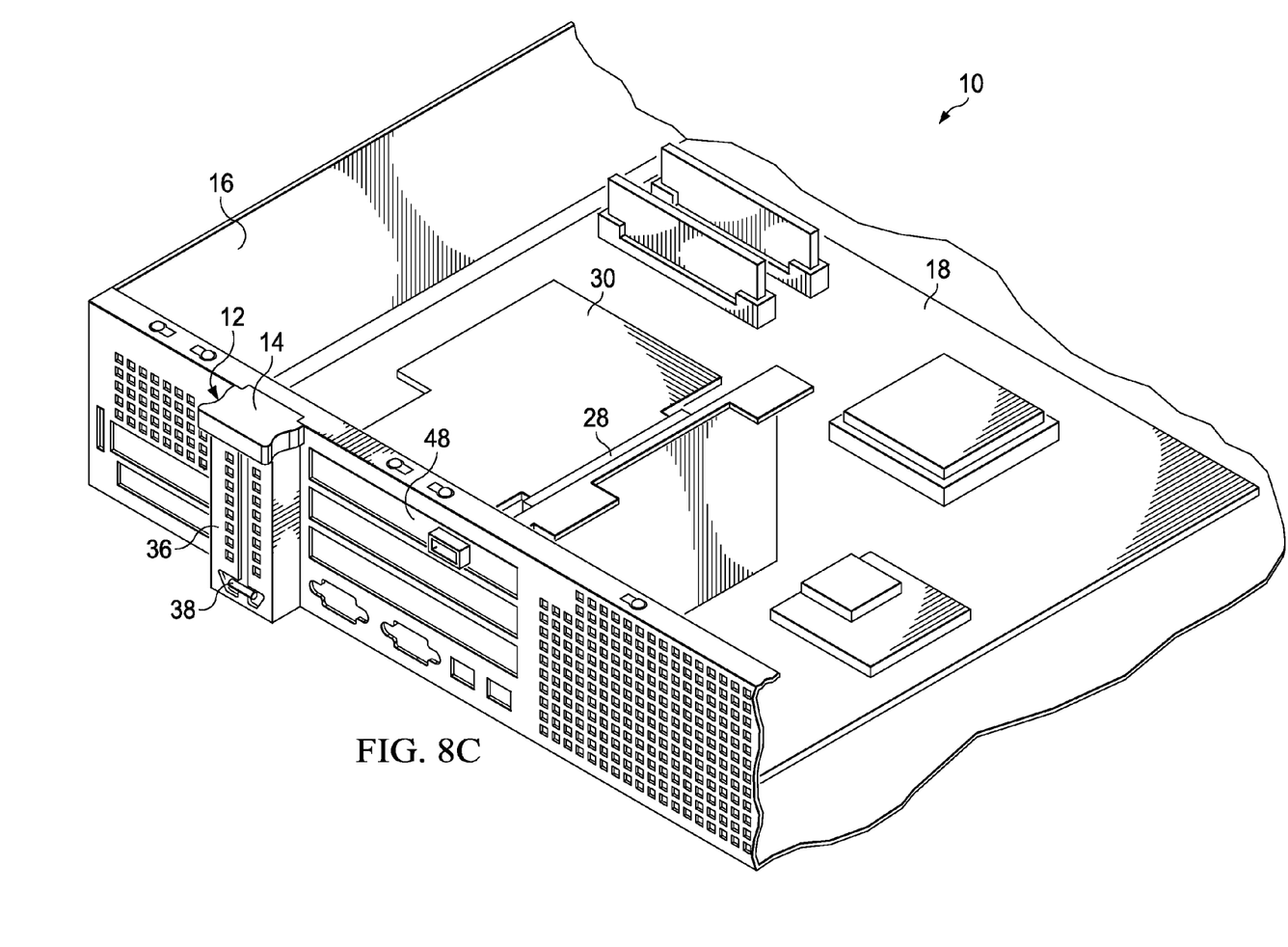
FIG. 8C depicts a top perspective exterior view of a daughter card secured by insertion of the tool-less retainer and latch into the retainer guide.

Referring now to FIGS. 8A-8C, securing of a daughter card 30 by an insertion of a tool-less retainer 12 and latch 14 into a retainer guide 36 is depicted. FIG. 8A depicts retainer 12 fully removed from retainer guide 36 and rotated about hinge member 38 to an idle position, which removes retainer 12 from interfering with an end user attempting to manipulate daughter cards 30 within the interior of chassis 16. Once daughter cards are interfaced with expansion slots of information handling system 10 and attached to chassis 16 with securing elements 48, retainer 12 is inserted into retainer guide 36 to couple the daughter cards in place. FIG. 8B depicts rotation of retainer 12 about hinge member 38 for approximately 180 degrees to align retainer 12 with retainer guide 36. Retainer 12 inserts into retainer guide 36 and slides downward with hinge member 38 sliding down the hinge member opening formed in retainer guide 36. As retainer 12 fully inserts into retainer guide 36, latch 14 engages chassis 16 to keep retainer 12 in place until latch 14 is released, such as by a squeeze from an end user. FIG. 8C depicts retainer 12 fully inserted into retainer guide 36 and secured in place by latch 14. If an end user desires to remove retainer 12 from retainer guide 36 at the next withdrawal of retainer 12 from retainer guide 36, then hinge member 38 is pushed into the interior of retainer guide 36 at the fully inserted position so that hinge member 38 does not engage hinge member opening 40 at the next withdrawal.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis;
   a circuit board coupled to the chassis;
   a processor disposed on the circuit board and operable to execute instructions to process information;
   memory coupled to the circuit board and interfaced with the processor through the circuit board, the memory operable to store the instructions and the information;
   one or more daughter card slots disposed in the chassis and interfaced with the circuit board;
   a retainer guide coupled to the chassis proximate the one or more daughter card slots, the retainer guide having an opening and a length; and
   a retainer sized to slidingly engage the retainer guide at the opening and to slide into the retainer guide for the length, the retainer aligned to couple a daughter card to the chassis when the retainer slides through the retainer guide and past the location of the daughter card.

2. The information handling system of claim 1 further comprising a latch coupled to the retainer and operable to releaseably engage the retainer guide upon insertion of the retainer into the retainer guide by the length.

3. The information handling system of claim 1 further comprising a hinge member extending from the retainer to engage an opening formed along at least a portion of the length of the retainer guide, the hinge member rotationally coupling the retainer to the retainer guide upon removal of the retainer out of the length of the retainer guide.

4. The information handling system of claim 1 further comprising one or more grounding clips extending from the retainer to engage grounding points associated with the chassis.

5. The information handling system of claim 1 further comprising a daughter card interfaced with a daughter card slot, and wherein the retainer guide comprises a rectangular housing extending from the chassis and the retainer is sized to fit into the rectangular housing, the retainer guide bringing the retainer into proximity with securing element of the daughter card to retain the daughter card at the chassis.

6. The information handling system of claim 5 wherein the daughter card comprises a PCIe daughter card having a communications coupler exposed at the chassis.

7. The information handling system of claim 6 wherein the communications coupler comprises an Ethernet interface.

8. The information handling system of claim 6 wherein the communications coupler comprises a graphics interface.

9. A method for securing a daughter card to an information handling system chassis, the method comprising:
   electrically interfacing the daughter card to one or more components disposed within the information handling system chassis;
   aligning a portion of the daughter card with a chassis side surface to expose a communications coupler at the chassis exterior; and
   sliding a retainer into a retainer guide proximate the daughter card, the retainer engaging a security element of the daughter card to secure the daughter card to the chassis.

10. The method of claim 9 further comprising:
    coupling the retainer to the retainer guide with a sliding hinge member;
    removing the retainer from the retainer guide, the retainer remaining coupled to the retainer guide with the hinge member; and
    rotating the retainer about the hinge member to rest out of alignment with the retainer guide.

11. The method of claim 10 further comprising:
    aligning the sliding hinge member with an opening of the retainer guide; and
    moving the sliding hinge member through the opening to release the retainer from the retainer guide.

12. The method of claim 9 further comprising:
    placing the retainer into an opening of the retainer guide;
    sliding the retainer through the opening along a length of the retainer guide to engage the daughter card security element; and
    engaging a latch of the retainer at the opening to maintain the retainer engaged with the daughter card security element.

13. The method of claim 9 further comprising engaging grounding clips of the retainer with grounding points of the retainer guide during the sliding.

14. The method of claim 13 wherein the grounding clips couple with electromagnetic interference shielding integrated in the retainer.

15. The method of claim 9 wherein sliding a retainer further comprises sliding the retainer into a retainer guide disposed at the exterior of the chassis, the retainer engaging the security element at the interior of the chassis.

16. A system for securing one or more daughter cards to a chassis, the system comprising:
    a retainer guide having an opening and a length, the length oriented perpendicular to the one or more daughter cards; and
    a retainer sized to fit in the retainer guide at the opening and to slide through the opening for the length, the retainer engaging the one or more daughter cards along the length to secure the one or more daughter cards to the chassis.

17. The system of claim 16 further comprising:
    grounding points located along the length of the retainer guide; and
    grounding clips disposed on the retainer aligned to engage the grounding points.

18. The system of claim 16 further comprising:
    a hinge member extending from the retainer and through a hinge opening of the retainer guide;
    wherein the hinge opening of the retainer guide is along the length to slidingly engage the hinge member as the retainer inserts through the opening and slides along the length, the hinge member supporting rotation of the retainer relative to the retainer guide when the retainer is external to the retainer guide.

19. The system of claim 18 further comprising a latch coupled to the retainer and aligned to engage with the retainer guide upon insertion of the retainer into the opening for the length.

20. The system of claim 16 wherein the retainer guide comprises plastic having metal electromagnetic shielding.

* * * * *